(12) United States Patent
Johnson (10) Patent No.: US 10,328,963 B2
(45) Date of Patent: Jun. 25, 2019

(54) HARNESS AND PULLING ASSEMBLY (71) Applicant: NEW WEST ANALYTICS CORPORATION, New Westminster (CA)

(72) Inventor: Jerry Richmond Johnson, New Westminster (CA)

( * ) Notice: Subject to any disclaimer, the term of this patent is extended or adjusted under 35 U.S.C. 154(b) by 10 days.

(21) Appl. No.: 15/614,327

(22) Filed: Jun. 5, 2017

(65) Prior Publication Data

US 2017/0267270 A1    Sep. 21, 2017

Related U.S. Application Data

(63) Continuation-in-part of application No. PCT/US2015/064077, filed on Dec. 4, 2015.

(60) Provisional application No. 62/441,237, filed on Dec. 31, 2016, provisional application No. 62/087,853, filed on Dec. 5, 2014.

(51) Int. Cl.
*B62B 5/06* (2006.01)
*B62B 1/12* (2006.01)
*B62B 7/02* (2006.01)
*B62B 5/08* (2006.01)

(52) U.S. Cl.
CPC .............. *B62B 5/068* (2013.01); *B62B 1/12* (2013.01); *B62B 5/082* (2013.01); *B62B 7/02* (2013.01)

(58) Field of Classification Search
CPC .. B62B 5/068; B62B 5/08; B62B 1/10; B62B 1/12; B62B 7/02
See application file for complete search history.

(56) References Cited

U.S. PATENT DOCUMENTS

| 660,598 | A | | 10/1900 | Stonebridge | |
|---|---|---|---|---|---|
| 2,343,019 | A | | 2/1944 | Neal | |
| 2,872,214 | A | * | 2/1959 | Hume | B60D 1/34 280/489 |
| 3,328,043 | A | * | 6/1967 | Johnson | B62B 5/068 280/1.5 |
| 3,331,618 | A | * | 7/1967 | Head | B60D 1/34 280/406.2 |
| 3,848,890 | A | * | 11/1974 | MacAlpine | B62K 27/12 280/204 |

(Continued)

FOREIGN PATENT DOCUMENTS

DE    202008004993 U1    7/2008
DE    202014007028 U1    12/2014

OTHER PUBLICATIONS

Patent Cooperation Treaty International Search Report dated Mar. 17, 2016 issued for the parent application assigned International Application No. PCT/US2015/064077 with an International Filing Date of Dec. 4, 2015.

(Continued)

*Primary Examiner* — Joseph M Rocca
*Assistant Examiner* — Maurice L Williams (57) ABSTRACT

A harness for pulling a carriage by a person is attached to a pulling assembly, which includes a rigid drawbar coupled to the carriage and a cantilevered member coupled to the forward end of the drawbar and to the harness. The cantilevered member partially isolates cyclical motion of the person from the drawbar, and may be a spring, a sprung rigid member or a rigid member controlled by an electronic servo.

12 Claims, 6 Drawing Sheets

(56) References Cited

U.S. PATENT DOCUMENTS

| | | | |
|---|---|---|---|
| 4,236,723 A * | 12/1980 | Lemmon | B62B 5/068 |
| | | | 280/1.5 |
| 4,335,875 A | 6/1982 | Elkin | |
| 4,371,184 A * | 2/1983 | Henden | B62K 27/12 |
| | | | 280/204 |
| 4,473,991 A | 10/1984 | La Mura et al. | |
| 4,548,423 A * | 10/1985 | Craven | B60D 1/00 |
| | | | 280/204 |
| 4,848,780 A | 7/1989 | Straub | |
| 5,056,301 A | 10/1991 | Garland et al. | |
| 5,062,651 A | 11/1991 | Varieur | |
| 5,106,108 A | 4/1992 | Howell | |
| 5,183,279 A | 2/1993 | Acerno et al. | |
| 5,215,318 A * | 6/1993 | Capraro | A45C 5/14 |
| | | | 280/1.5 |
| 5,215,355 A | 6/1993 | Klumpjan | |
| 5,244,217 A | 9/1993 | Kotulla | |
| 5,265,891 A | 11/1993 | Diehl | |
| 5,375,861 A | 12/1994 | Gifford | |
| 5,470,088 A * | 11/1995 | Adams | B60D 1/00 |
| | | | 24/279 |
| 5,622,294 A | 4/1997 | Evans | |
| 5,735,361 A | 4/1998 | Forrest | |
| 5,842,444 A | 12/1998 | Perrulli | |
| 6,006,968 A | 12/1999 | McCarthy et al. | |
| 6,027,001 A | 2/2000 | Levitan | |
| 6,039,333 A | 3/2000 | Hamblin | |
| 6,131,917 A | 10/2000 | Walsh | |
| 6,139,033 A | 10/2000 | Western | |
| 6,349,949 B1 | 2/2002 | Gorringe | |
| 6,450,377 B1 | 9/2002 | Oriolo | |
| 6,685,198 B1 | 2/2004 | Hartman | |
| 6,796,575 B2 * | 9/2004 | Humes | B60D 1/00 |
| | | | 280/503 |
| 7,007,956 B1 | 3/2006 | Pinon | |
| 7,114,731 B2 | 10/2006 | Malrick | |
| 7,246,802 B2 | 7/2007 | Yeung | |
| 7,311,313 B1 | 12/2007 | Ray et al. | |
| 7,422,223 B1 | 9/2008 | Silliman | |
| 7,487,980 B2 | 2/2009 | Goddard et al. | |
| 7,600,764 B1 * | 10/2009 | Parker | B62B 5/068 |
| | | | 280/416 |
| 7,818,951 B1 | 10/2010 | Boutilier | |
| 7,938,409 B2 | 5/2011 | Mejia | |
| 8,091,899 B2 | 1/2012 | Mejia | |
| 8,100,816 B2 | 1/2012 | Daniel | |
| 8,801,322 B2 * | 8/2014 | Shalaby | B62B 3/12 |
| | | | 24/270 |
| 9,365,224 B1 * | 6/2016 | Koshutin | B62B 1/042 |
| 9,434,401 B2 * | 9/2016 | Johnson | B62B 1/10 |
| 9,840,266 B2 * | 12/2017 | Caradec | B62B 7/02 |
| 2001/0030402 A1 | 10/2001 | White | |
| 2001/0038190 A1 * | 11/2001 | Provencher | B62K 27/006 |
| | | | 280/281.1 |
| 2001/0040350 A1 * | 11/2001 | Allen | B62B 5/06 |
| | | | 280/1.5 |
| 2001/0043000 A1 | 11/2001 | Hinds | |
| 2003/0067130 A1 | 4/2003 | Gordon | |
| 2003/0111813 A1 | 6/2003 | Assaf et al. | |
| 2004/0016781 A1 | 1/2004 | Smith | |
| 2004/0050636 A1 * | 3/2004 | Forbes | B62B 5/068 |
| | | | 190/18 A |
| 2006/0055128 A1 * | 3/2006 | Scott | B62B 5/068 |
| | | | 280/1.5 |
| 2006/0237918 A1 * | 10/2006 | Satorius | A45F 3/14 |
| | | | 280/1.5 |
| 2007/0187910 A1 | 8/2007 | Adams | |
| 2008/0018063 A1 * | 1/2008 | Morowat | B62B 5/068 |
| | | | 280/1.5 |
| 2008/0174078 A1 | 7/2008 | Dooley | |
| 2008/0238024 A1 | 10/2008 | Heidenreich et al. | |
| 2008/0296326 A1 | 12/2008 | Berlin | |
| 2008/0296851 A1 | 12/2008 | Hall | |
| 2009/0057355 A1 | 3/2009 | Weiss | |
| 2009/0261540 A1 | 10/2009 | Mejia | |
| 2010/0204628 A1 | 8/2010 | Ghajar | |
| 2012/0038124 A1 | 2/2012 | Newton, Jr. | |
| 2013/0300072 A1 * | 11/2013 | Piaget | B62B 5/0079 |
| | | | 280/1.5 |
| 2014/0203529 A1 | 7/2014 | Ortega | |
| 2014/0265167 A1 | 9/2014 | Mejia | |

OTHER PUBLICATIONS

Patent Cooperation Treaty Written Opinion of the International Search Authority dated Mar. 17, 2016 issued for the parent application assigned International Application No. PCT/US2015/064077 with an International Filing Date of Dec. 4, 2015.
Machine Translation for: DE202008004993U1; Machine Translation for: DE202014007028U1.

* cited by examiner

HARNESS AND PULLING ASSEMBLY

TECHNICAL FIELD

The present disclosure relates generally to a harness and pulling assembly, and more particularly to a pulling assembly designed to couple the harness to a carriage while at the same time partially isolating some of the cyclical motion of the user from the carriage.

BACKGROUND

When a person pulls a carriage by hand, the person's hands can act as hinges and the person's arms can act as springs to isolate the person's periodic or cyclic motions from the carriage. Periodic or cyclic motions of the person, such as when they walk, jog, or run to pull the carriage, include vertical motion (as the person lunges up and down) and horizontal motion (as the person surges forward with each step). Pulling a carriage by holding handles can be inefficient and uncomfortable due to differences between natural motions of the person and the carriage. For example, at fast gaits, such as when the person is running, the person's body can be impeded from moving through natural ranges of motion, and the person's arms can be impeded from swinging naturally. Thus, some hands-free pulling systems exist that connect pull-behind carriages to a person's waist or torso. Such hands-free pulling systems often inadequately isolate the person's periodic or cyclic motions from the carriage, and/or inadequately distribute resulting forces across the person's body.

This background information is provided to reveal information believed by the applicant to be of possible relevance to the present invention. No admission is necessarily intended, nor should be construed, that any of the preceding information constitutes prior art against the present invention.

SUMMARY OF INVENTION

An apparatus can be summarized as including a pull-behind rickshaw carriage having exactly two wheels, a rigid drawbar attached to the carriage, a spring mounted to the rigid drawbar, and a harness to be worn by a human, the harness attached to the spring.

The drawbar can be mounted rigidly to the carriage. The length of the spring can be adjustable. The angle of attachment of the spring to the drawbar can be adjustable. The spring can be a leaf spring. The harness can be attached to the spring by a double axis hinge. The harness can include a pressure-distributing plate. The pressure-distributing plate can be rigid. The pressure-distributing plate can be rectangular. The pressure-distributing plate can be greater than 4 inches long and greater than 4 inches wide. The harness can include a waistband.

Disclosed herein is an apparatus comprising a pull-behind carriage having two wheels; a pulling assembly comprising a rigid drawbar attached at a trailing end thereof to said carriage and a member cantilevered from a leading end of the rigid drawbar, attached to the drawbar at a trailing end of the member, wherein the member at least partially isolates cyclical motion of a leading end of the member from the drawbar; and a harness configured to be worn by a human, the harness attached to the leading end of the member.

In some embodiments the member is a sprung member, the sprung member is undamped, the sprung member is a leaf spring or the sprung member is a sprung rigid member. Some embodiments comprise an axial elastic member by which the sprung rigid member is sprung. The axial elastic member may be a helical spring. Some embodiments comprise a torsion spring by which the sprung rigid member is sprung. The torsion spring may be a coil spring. Some embodiments comprise a pneumatic spring by which the sprung rigid member is sprung. Some embodiments comprise an electronic servo programmed to simulate a spring, by which the sprung rigid member is sprung.

In some embodiments, the member is a rigid member, the apparatus further comprising an electronic servo connected between the rigid member and the drawbar and programmed to maintain the drawbar at a fixed elevation.

In some embodiments, the leading end of the member can move relative to the drawbar in a vertical plane but not in a horizontal plane. In some embodiments, the harness is attached to the leading member without slack between the harness and the leading end of the member. In some embodiments, the attachment between the harness and the leading end of the member is a one and only supportive attachment of the pulling assembly to the harness. In some embodiments, motion of the leading end of the member relative to the drawbar is unguided.

BRIEF DESCRIPTION OF DRAWINGS

The following drawings illustrate embodiments of the invention, which should not be construed as restricting the scope of the invention in any way.

DESCRIPTION

In the following description, certain specific details are set forth in order to provide a thorough understanding of various disclosed embodiments. One skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
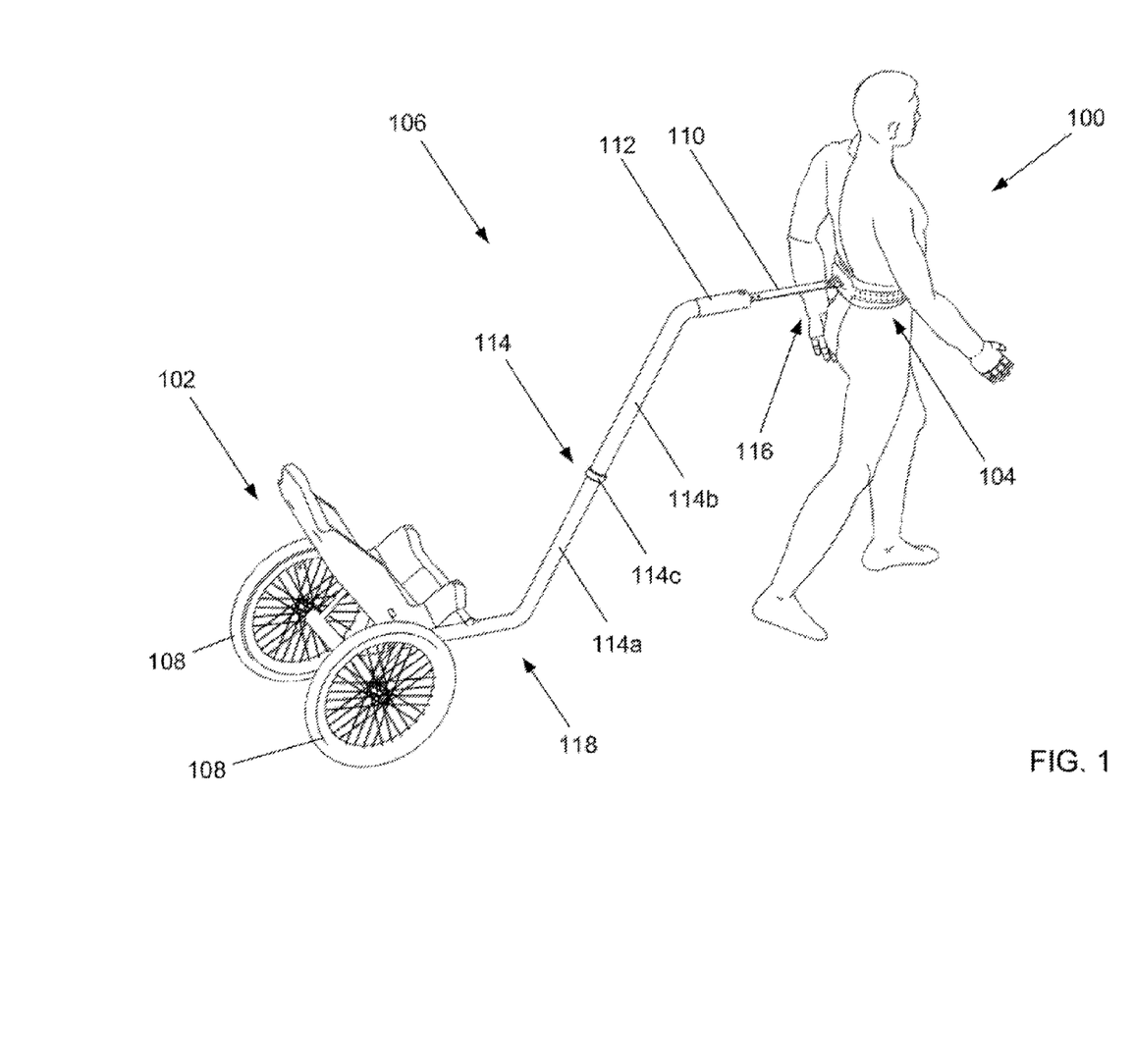
FIG. 1 is a perspective view of a person pulling a carriage using a harness and pulling assembly, according to at least one illustrated embodiment.

FIG. 1 illustrates a person (a human) 100 pulling or towing a pull-behind and hands-free carriage 102. More specifically, FIG. 1 illustrates the person 100 pulling the carriage 102 using a harness 104 coupled to their waist and a pulling assembly 106 coupled at a first, leading, or front end 116 proximate the person 100, to the harness 104, and coupled at a second, trailing, rear, or carriage end 118 proximate the carriage 102, to the carriage 102. The harness 104 and pulling assembly 106 can be used by the person 100 to pull the carriage 102 while doing daily activities such as child care, shopping at a grocery store, or running for exercise.

The carriage 102 can be a wheeled conveyance, cart, or trailer to be pushed or pulled by the person 100. The carriage 102 can be a two-wheeled rickshaw-type carriage 102, which can be a stroller such as a walking, jogging, or running stroller for carrying one or more children or animals, such as in seats in the carriage 102, or for carrying various goods. The carriage 102 can have exactly two, exactly three, exactly four, or more than four wheels 108. The weight of the carriage 102 can be balanced about an axle for the wheels 108, or the carriage 102 can be designed such that with a load in the carriage 102, the weight of the carriage 102 and the load together is balanced about the axle. In some implementations, the axle for the wheels 108 can be adjustable forwards and rearwards with respect to the rest of the carriage 102 such that a user of the carriage 102 can balance the weight of the carriage 102 and any load held within the carriage 102 about the axle. The carriage 102 can have a low center of gravity to prevent or reduce the likelihood of the carriage 102 tipping over.

The harness 104 includes a wearable device that can be worn by the person 100 and allows the pulling assembly 106 to be attached to the person 100. The harness 104 is designed to spread forces from the pulling assembly 106 over a significant area of the waist or torso of the person 100 to reduce discomfort to the person 100. For example, the harness 104 can include one or more (e.g., one, two, three, four, five, six, seven, eight, nine, ten, or more) pressure-distributing plates, which can also be referred to as weight-distributing or load-distributing plates. The harness 104 can include a belt, vest, jacket, and/or shoulder straps, as well as padding to further reduce discomfort to the person 100.

Figure 2:
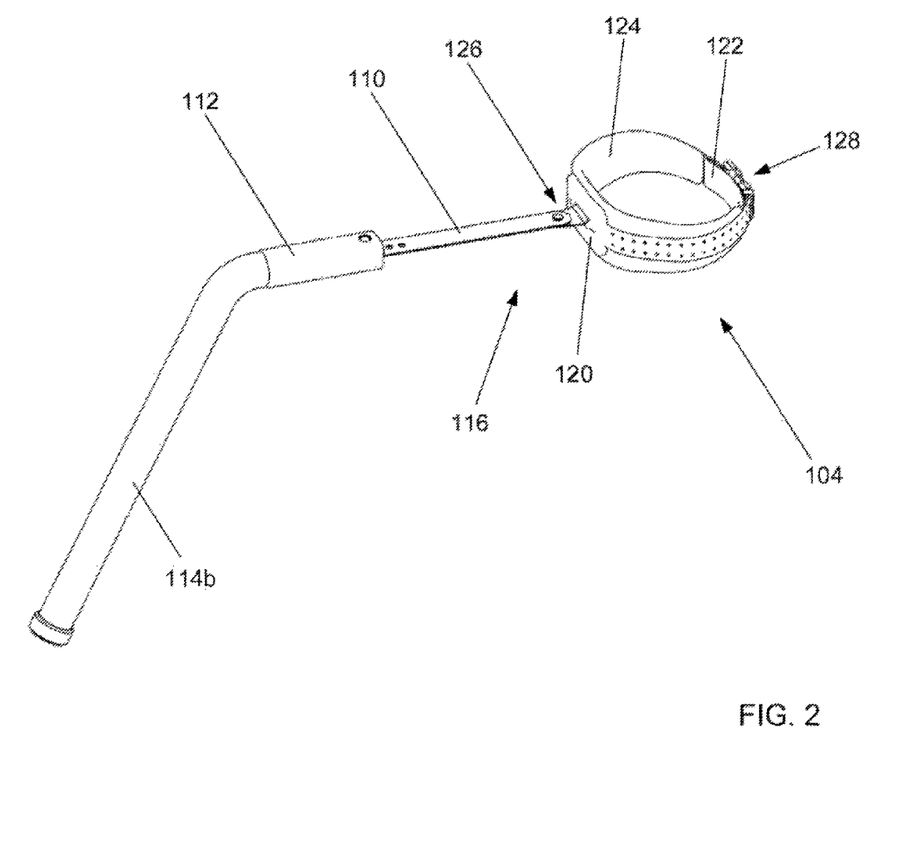
FIG. 2 is a perspective view of the harness and portions of the pulling assembly of FIG. 1, according to at least one illustrated embodiment.

As illustrated in FIG. 2, the harness 104 can include a rear pressure-distributing plate 120 configured to be positioned at the back of the torso of the person 100, a front pressure-distributing plate 122 configured to be positioned at the front of the torso of the person 100, and one or more (e.g., two) belts or straps 124 to couple the pressure-distributing plates 120, 122 to one another. Together, the plates 120, 122, and the straps 124 can form a waistband that wraps around the waist or torso of the person 100. The straps 124 can include one or more buckles 128 to allow the waistband to be secured to, and/or adjusted around, the waist of the person 100.

The pressure-distributing plates 120, 122 include padding and are configured to fit snugly against the body of the person 100 to reduce slipping of the harness 104 relative to the person 100, and to increase comfort, such as by reducing frictional wear against the body of the person 100. The padding can be breathable and allow heat dissipation from the person 100 to the surrounding environment. The pressure-distributing plates 120, 122 can be rigid and can be formed from rigid materials such as a metal, plastic, wood, carbon fiber, Kevlar™, or other rigid material. The pressure-distributing plates 120, 122 have square or rectangular shapes, with lengths and/or widths of at least 4, 5, 6, 7, 8, 9, or 10 inches.

Referring to both FIGS. 1 and 2, the pulling assembly 106 includes a spring 110, a variable angle bracket 112, and a drawbar 114 including a lower drawbar portion 114a and an upper drawbar portion 114b telescopically adjustable relative to the lower drawbar portion 114a at a telescoping joint 114c. The spring 110 and the variable angle bracket 112 can be referred to together as a stabilizer. The drawbar 114 couples the carriage 102 to the harness 104 and thereby to the person 100. The drawbar 114 is rigid and formed from a rigid material such as carbon fiber, wood, plastics, or metals such as tubes of steel, aluminum, titanium, or their alloys. The drawbar 114 can have a length greater than 2, 2½, 3, or 3½ feet, or can have a length less than 5, 4½, 4, or 3½ feet. The drawbar 114 can have a length of about 3½ feet. While this exemplary embodiment shows the bracket 112 as distinct from the drawbar 114, the bracket can be considered to be part of the drawbar in other embodiments.

Figure 3:
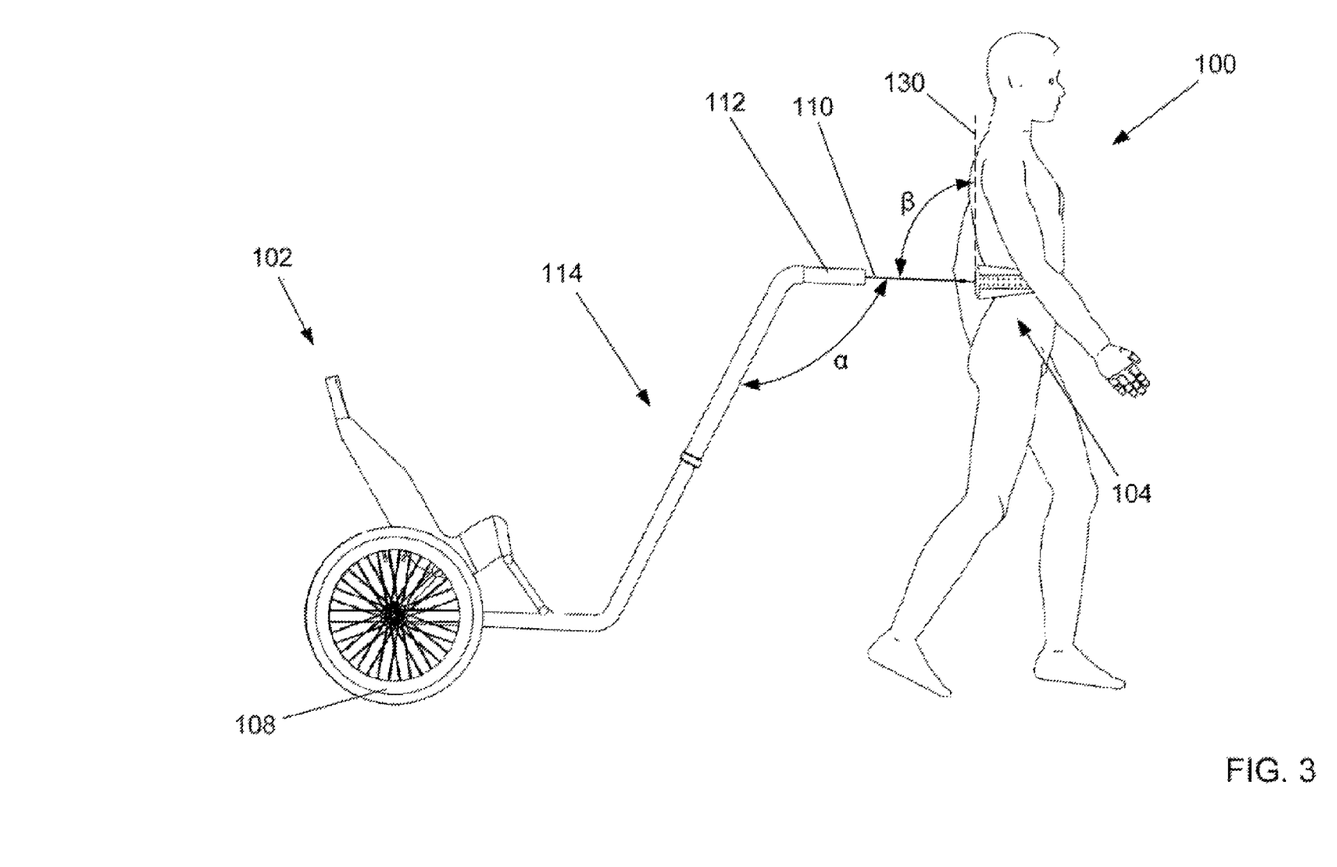
FIG. 3 is a side view of the person pulling the carriage using the harness and pulling assembly of FIG. 1, according to at least one illustrated embodiment.

The spring 110 can include one or more leaf springs, coil springs, hydraulic springs, and/or pneumatic springs coupled at a first or leading end to the harness 104 and at a second or trailing end opposite the first end to the variable angle bracket 112. The spring 110 can be a leaf spring that is flexible (e.g., configured to bend) about a single horizontal bending axis perpendicular to its length, and can be rigidly confined to a plane perpendicular to the single horizontal bending axis. Thus, the spring 110 can be rigid along its own length such that a length of the spring 110 remains substantially unchanged in response to compressive or tensile forces exerted along the length of the spring 110. Further, the spring 110 can be a vertically acting spring that isolates vertical motion of the person 100 from the drawbar 114 and the carriage 102. A length of the spring 110, a flexibility or stiffness of the spring 110, and an angle at which the spring 110 is coupled to the drawbar 114 (e.g., the angle α between the spring 110 and the drawbar 114 in FIG. 3) and/or to the person 100 (e.g., the angle β between the spring 110 and a vertical line 130 in FIG. 3) can be adjustable. As shown in FIG. 3, the angle β can be less than 90 degrees.

The spring 110 can at least partially decouple or isolate periodic or cyclic motion of the person 100 from the carriage 102. This can reduce or minimize shaking of the carriage 102 and any passengers or other items held therein, and can reduce discomfort to the person 100. The spring 110 can be flexible or elastic relative to the drawbar 114. The spring 110 can be formed from carbon fiber, plastics, or metals such as aluminum. The spring 110 can have a length greater than 1, 2, 3, 6, or 12 inches, or can have a length less than 24, 20, 18, 16, 14, or 12 inches. The spring 110 can have a length of about 12 inches. The drawbar 114 can have a length that is at least as long as the length of the spring 110. The drawbar 114 can have a length that is at least 2, 3, 4, 5, 10, 20, 30, 40, or 60 times as long as the length of the spring 110. In some implementations, maximizing the length of drawbar 114 relative to the length of the spring 110 can improve or optimize the effectiveness of the system.

The variable angle bracket 112 is coupled at a first end to the spring 110 and at a second end opposite the first end to the drawbar 114. The variable angle bracket 112 can be adjustable to allow adjustment of the length of the spring 110 and of the angle at which the variable angle bracket 112 is coupled to the drawbar 114, to allow adjustment of the angles α and β, at which the spring 110 is coupled to the drawbar 114 and/or to the person 100, respectively. For example, the length of the spring 110 can be selected or optimized to control a stiffness of the spring 110, such as to tune a resonant frequency of the pulling assembly 106 and carriage 102 (which can depend on the stiffness of the spring 110 and the weight of the mass of the carriage 102 including any items carried therein) to match or avoid matching a gait of the person 100. As another example, the angles α and β, at which the spring 110 is coupled to the drawbar 114 and/or to the person 100, respectively, can be selected or optimized such that effects of a vertical component of the periodic or cyclic motions of the person 100 are canceled or offset, or at least partially canceled or offset, by effects of a horizontal component of the periodic or cyclic motions of the person 100.

Various joints can be used to couple the carriage 102 to the drawbar 114, the drawbar 114 to the variable angle bracket 112, the variable angle bracket 112 to the spring 110, and the spring 110 to the harness 104. As examples, rigid joints or joints flexible or rotatable about a single one, exactly two, or three mutually orthogonal axes can be used to couple the various components to one another. As specific examples, the carriage 102 can be rigidly coupled to the drawbar 114, or can be coupled to the drawbar 114 by a hinge joint rotatable about a single axis, and the spring 110 can be coupled to the harness 104 by a double hinge joint 126 rotatable about exactly two orthogonal axes, such as a first, vertical axis and a second, horizontal axis perpendicular to the first axis and perpendicular to a length of the spring 110. The double hinge joint 126 can be a part of or directly coupled to the rear pressure-distributing plate 120 of the harness 104. The double hinge joint 126 can allow the person 100 to bend, kneel, and turn to look back at the carriage 102, and otherwise move about relatively freely while wearing the harness 104.

The harness 104 and pulling assembly 106 can be designed to allow for compact storage. For example, any of the components herein can be telescoping or foldable so they can be made more compact for storage. The harness 104 and pulling assembly 106 can also be designed to be rapidly converted to allow the person 100 to push, rather than pull, the carriage 102, so the person 100 can pull the carriage 102 to a grocery store, push the carriage 102 through the store, and then pull the carriage 102 away from the store. For example, the double hinge joint 126 can be removed from the rear-pressure distributing plate 120 and coupled to the front pressure-distributing plate 122. A kit can include the carriage 102, the harness 104, the pulling assembly 106, and a set of instructions regarding methods of coupling the various components to one another and methods of adjusting the various components to improve or optimize performance.

In some implementations, the pulling assembly 106 includes a plurality of drawbars 114, a plurality of adjustable angle brackets 112, and/or a plurality of springs 110. In some implementations, the carriage 102 and/or the harness 104 can include a safety strap or other braking feature to prevent the carriage 102 from rolling away from the person 100 if the drawbar 114 becomes disconnected from the carriage 102 and/or the person 100, or if the person 100 loses control of the carriage 102. Any of the components described herein can be fabricated from lightweight, rigid, and strong materials such as carbon fiber, plastics, or metals such as aluminum, steel, or titanium, or combinations of such materials.

Spring

Figure 4:
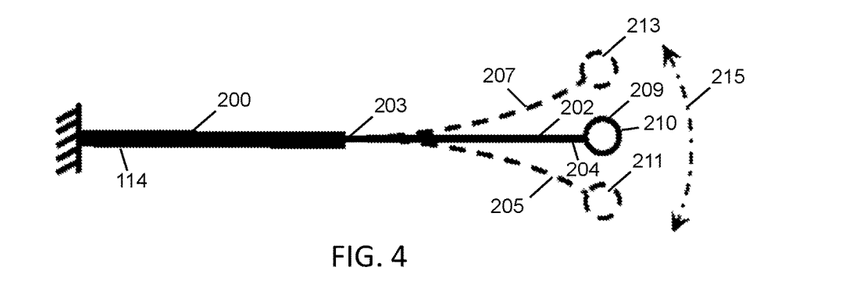
FIG. 4 is a schematic model of the drawbar and leaf spring, according to at least one embodiment of the present invention.

Referring to FIG. 4, a model of the leaf spring version of the pulling assembly 106 (FIG. 1) is shown. The upper or leading end 200 of the drawbar 114 is shown connected to a leaf spring 202 at point 203. The upper end 200 of the drawbar includes the angle bracket 112 (FIG. 1). The leaf spring 202 is cantilevered from the end 200 of the drawbar 114 via a moment-bearing connection. The rest position of the leaf spring is position 204, and its range of motion is from lower position 205 through the rest position 204 to the upper position 207. Correspondingly, the leading end 209 of the leaf spring 202 farthest from the drawbar 200 moves from the lower position 211, through the rest or neutral position 210 to upper position 213, along an arc 215. Even though it bends, the length of the leaf spring 202 remains substantially the same throughout its range of movement. Accordingly, the length of the pulling assembly 106 remains substantially constant, while being able to flex in the region of the leaf spring 202.

The result of the arrangement with the leaf spring 202 is that the outermost end 209 of the spring is able to move in an up-down direction relative to the drawbar 114, along arc 215, whereas it is not able to move left and right, or extend and retract, relative to the drawbar 114. Note that while the end 200 of the drawbar is here shown to be horizontal, it may in other embodiments be inclined, and the frame of reference in which the end 209 of the spring moves will be correspondingly inclined.

Figure 5:
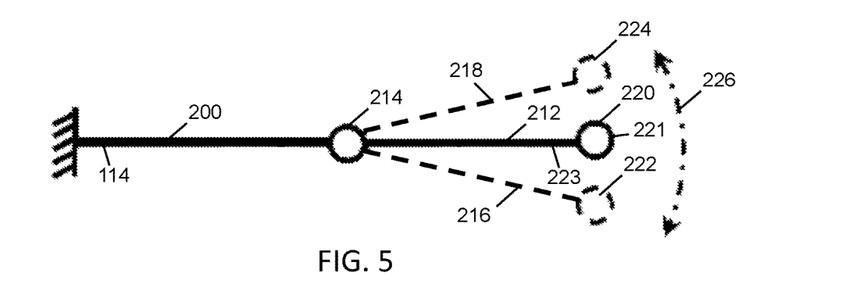
FIG. 5 is a schematic model of the drawbar and sprung rigid member, according to at least one embodiment of the present invention.

Referring to FIG. 5, a model of an alternate pulling assembly is shown with a straight, sprung rigid member 212. The upper end 200 of the drawbar 114 is shown connected to a sprung rigid member 212 at pivot point 214. Point 214 only allows pivoting about a single axis that is perpendicular to the plane of the paper. The upper end 200 of the drawbar includes the angle bracket 112 (FIG. 1). The leaf spring of FIG. 4 can be approximated to the sprung rigid member 212 that pivots about point 214 from a lower position 216 to an upper position 218. The rest position of the sprung rigid member 212 is position 223. The leading end 220 of the sprung rigid member 212 farthest from the end 200 of the drawbar 114 moves from the lower position 222, through the rest or neutral position 221 to upper position 224, along arc 226. Even though the arc 226 is not as curved as the arc 215 for the leaf spring 202 model, it represents an acceptable alternative embodiment of the invention. As the length of the sprung rigid member 212 is fixed, the length of the pulling assembly 106 remains substantially constant, while being able to fold at pivot point 214.

The result of the arrangement with the sprung rigid member 212 is that the outermost end 220 of the member 212 is able to move in an up-down direction relative to the drawbar 114, along arc 226, whereas it is not able to move left and right, or extend and retract, relative to the drawbar 114. This is similar to the leaf spring arrangement. Note that while the end 200 of the drawbar is here shown to be horizontal, it may in other embodiments be inclined, and the frame of reference in which the end 220 of the member 212 moves will be correspondingly inclined.

Another aspect of the pulling assembly is that the leaf spring 202 and the sprung rigid member 212 are undamped. An advantage of an undamped spring is that there is no energy dissipation while it is being repeatedly flexed one way and then the other, or otherwise energized and de-energized. While there are some natural losses in springs, however, there is no additional damping intentionally added to the leaf spring 202 or sprung rigid member 212; hence the spring can be considered to be undamped, i.e. without added friction, or without any shock absorbing feature. As such, the energy that is used to cyclically energize the spring as the user runs or walks is returned to the user as the spring de-energizes in other parts of the running or walking cycle.

A further aspect of the configuration of the pulling assembly 106 with either the leaf spring 202 or the sprung rigid member 212 is that motion of the end 209 or end 220 relative to the drawbar 114 does not need to be guided or constrained by any additional components. For the leaf spring 202, this is because it has inherent rigidity in a direction perpendicular to its flexing direction, and is essentially of fixed length. For the rigid member, the end 220 can move only up and down due to the pivot point 214. In contrast, if the leaf spring 202 were replaced by a helical spring, then there would be two extra degrees of freedom in the movement of end point 220, which would then need to be constrained to move only in the substantially vertical direction. Such constraint would introduce unwanted friction and damping.

A benefit of the above configurations is that the end 209 or end 220 attaches at a single point to the harness 104 (FIG. 1). No other joining feature is necessary to support the drawbar 114 on the harness 104. Of course, a safety strap may be used but this does not provide support to, or bear any weight of, the drawbar 114 in normal use. It would only come into play if the leaf spring 202 or rigid member 212 became detached from the harness 104. The pulling assembly 106 is therefore supportively connected to the harness 104 by a single member, which may be a single leaf spring 202 or a sprung rigid member 212.

A further benefit of the above configurations is that there is no slack between the drawbar 200 and the harness 104. If there were slack, then the pulling assembly 106 would jolt around as the user pulls it along. Such slack would be present, for example, if the drawbar 200 were attached to the harness via a rope or links of a chain.

Figure 6:
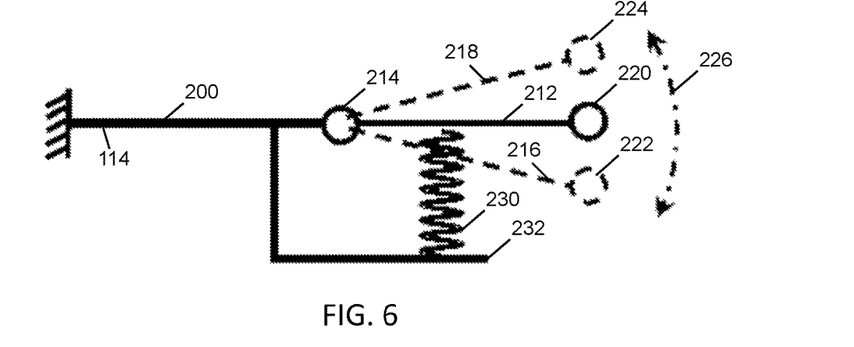
FIG. 6 is a schematic model of the drawbar with a helical spring, according to at least one embodiment of the present invention.

Referring to FIG. 6, a model of an embodiment using a helical spring 230 is shown. In this embodiment, the straight rigid member 212 pivots about point 214, between lower position 216 and upper position 218. Point 214 only allows pivoting about a single axis that is perpendicular to the plane of the paper. As before, the end 220 of the member 212 moves from lower position 222 to upper position 224, as the spring is respectively compressed and extended. The helical spring 230 is retained between base 232, which is rigidly attached to the upper end 200 of drawbar 114, and the rigid member 212. The effect of using a helical spring is, for all intents and purposes, equivalent to using a leaf spring, because the end 220 of the rigid member is able to move in an essentially vertical direction along a slight arc relative to the position of the drawbar 200, and not in extension/retraction parallel to the length of the end 200 of the drawbar 114, nor in a left-right direction relative to the pulling assembly itself (i.e. in a direction in and out of the plane of the paper).

The helical spring may, in other embodiments, be replaced with a different axial elastic member.

Figure 7:
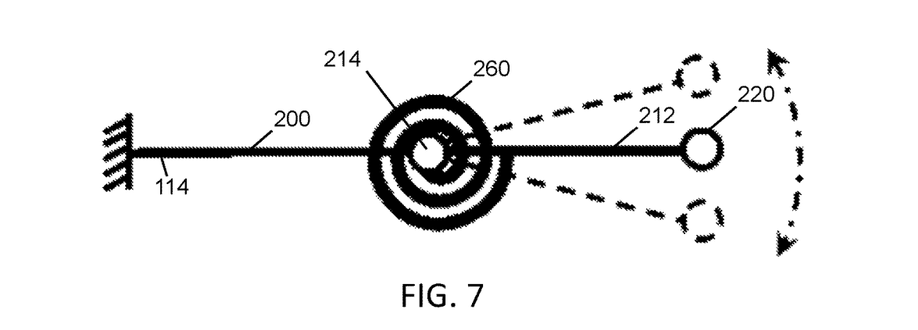
FIG. 7 is a schematic model of the drawbar with a coil spring, according to at least one embodiment of the present invention.

Referring to FIG. 7, a further embodiment is shown with a coil spring 260, which is attached to the end 200 of the drawbar 114 at the pivot point 214 at one of its ends and to the rigid member 212 at its other end. As above, the end 220 of the rigid member 212 is able to move in a substantially vertical direction, along a slight arc, but not in extension and retraction in-line with the drawbar 200, nor in a left-right direction. Use of the coil spring 260 is therefore equivalent to use of the helical spring 230 and the leaf spring 202. Other torsion springs may also be used instead, such as an axial torsion spring that twists to provide the spring force.

Figure 8:
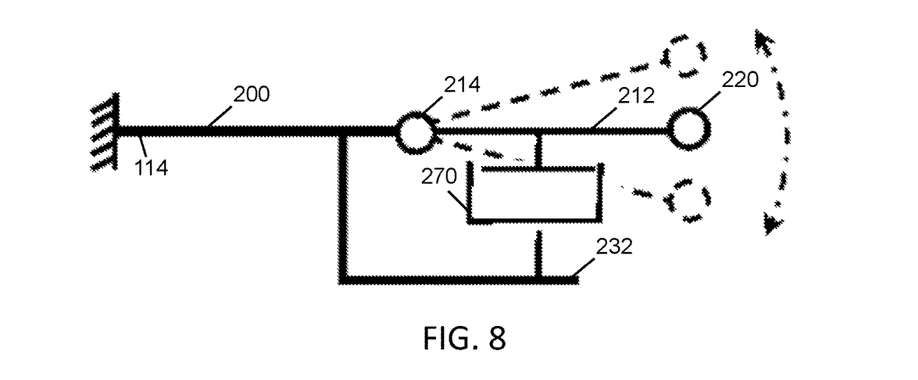
FIG. 8 is a schematic model of the drawbar with a pneumatic spring, according to at least one embodiment of the present invention.

Referring to FIG. 8, a further alternate embodiment is shown that uses a pneumatic spring 270, having a chamber of compressible gas. The pneumatic spring 270 is mounted between base 232, which is rigidly connected to the end 200 of drawbar 114, and the rigid member 212. As above, the end 220 of the rigid member 212 is able to move in a substantially vertical direction, along a slight arc, but not in extension and retraction in line with the end 200 of the drawbar 114, nor in a left-right direction relative to the pulling assembly itself. Use of the pneumatic spring 270 is therefore equivalent to use of the springs above.

Figure 9:
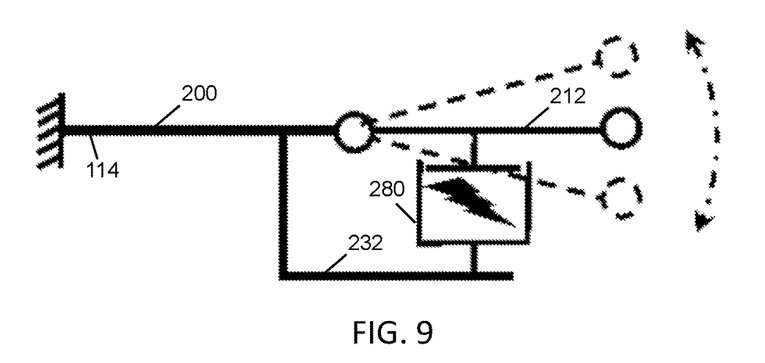
FIG. 9 is a schematic model of the drawbar with a servo programmed as a spring, according to at least one embodiment of the present invention.

In FIG. 9, a programmable electronic servo 280 is used to simulate a spring. The servo 280 is mounted between the base 232 and the rigid member 212. The effect of the servo spring 280 is the same as the preceding springs. It may be programmatically tuned instead of the user having to manually adjust the length of the leaf spring.

Figure 10:
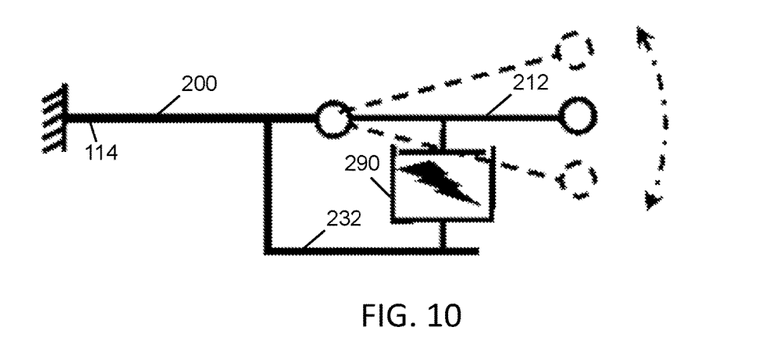
FIG. 10 is a schematic model of the drawbar with a servo programmed to enforce a fixed elevation of the drawbar, according to at least one embodiment of the present invention.

In FIG. 10, a programmable electronic servo 290 is used in place of a spring and is programmed to enforce a fixed drawbar elevation. In some embodiments, servo 290 could be the same as servo 280, with two different programs that the user can select.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

U.S. provisional patent applications No. 62/087,853, filed Dec. 5, 2014, and No. 62/441,237, filed Dec. 31, 2016, are hereby incorporated herein by reference in their entirety. The various embodiments described above can be combined and modified to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
   a pull-behind carriage having two wheels;
   a pulling assembly comprising:
      a rigid drawbar attached at a trailing end thereof to said carriage, wherein the drawbar is attached rigidly to the carriage; and
      a leaf spring projecting from a leading end of the rigid drawbar, attached to the drawbar at a trailing end of the leaf spring, wherein a leading end of the leaf spring can move relative to the drawbar in a vertical plane but not in a horizontal plane, wherein the leaf spring at least partially isolates vertical cyclical motion of the leading end of the leaf spring from the drawbar, wherein the leaf spring has an adjustable length, and wherein an angle of attachment of the leaf spring to the drawbar is adjustable; and
   a harness configured to be worn by a human, the harness attached to the leading end of the leaf spring.

2. The apparatus of claim 1, wherein the leaf spring is undamped.

3. An apparatus comprising:
a pull-behind carriage having two wheels;
a pulling assembly comprising:
   a rigid drawbar attached at a trailing end thereof to said carriage, wherein the drawbar is attached rigidly to the carriage;
   a sprung rigid member projecting from a leading end of the rigid drawbar, attached to the drawbar at a trailing end of the sprung rigid member, wherein a leading end of the sprung rigid member can move relative to the drawbar in a vertical plane but not in a horizontal plane, wherein the sprung rigid member at least partially isolates vertical cyclical motion of the leading end of the sprung rigid member from the drawbar; and
   an axial elastic member by which the sprung rigid member is sprung; and
a harness configured to be worn by a human, the harness attached to the leading end of the sprung rigid member.

4. The apparatus of claim 3, wherein the axial elastic member is a helical spring.

5. An apparatus comprising:
a pull-behind carriage having two wheels;
a pulling assembly comprising:
   a rigid drawbar attached at a trailing end thereof to said carriage, wherein the drawbar is attached rigidly to the carriage;
   a sprung rigid member projecting from a leading end of the rigid drawbar, attached to the drawbar at a trailing end of the sprung rigid member, wherein a leading end of the sprung rigid member can move relative to the drawbar in a vertical plane but not in a horizontal plane, wherein the sprung rigid member at least partially isolates vertical cyclical motion of the leading end of the sprung rigid member from the drawbar; and
   a pneumatic spring by which the sprung rigid member is sprung; and
a harness configured to be worn by a human, the harness attached to the leading end of the sprung rigid member.

6. An apparatus comprising:
a pull-behind carriage having two wheels;
a pulling assembly comprising:
   a rigid drawbar attached at a trailing end thereof to said carriage, wherein the drawbar is attached rigidly to the carriage;
   a sprung rigid member projecting from a leading end of the rigid drawbar, attached to the drawbar at a trailing end of the sprung rigid member, wherein a leading end of the sprung rigid member can move relative to the drawbar in a vertical plane but not in a horizontal plane, wherein the sprung rigid member at least partially isolates vertical cyclical motion of the leading end of the sprung rigid member from the drawbar; and
   an electronic servo programmed to simulate a spring, by which the sprung rigid member is sprung; and
a harness configured to be worn by a human, the harness attached to the leading end of the sprung rigid member.

7. An apparatus comprising:
a pull-behind carriage having two wheels;
a pulling assembly comprising:
   a rigid drawbar attached at a trailing end thereof to said carriage, wherein the drawbar is attached rigidly to the carriage;
   a sprung rigid member projecting from a leading end of the rigid drawbar, attached to the drawbar at a trailing end of the sprung rigid member, wherein a leading end of the sprung rigid member can move relative to the drawbar in a vertical plane but not in a horizontal plane, wherein the sprung rigid member at least partially isolates vertical cyclical motion of the leading end of the sprung rigid member from the drawbar; and
   an electronic servo connected between the sprung rigid member and the drawbar and programmed to maintain the drawbar at a fixed elevation; and
a harness configured to be worn by a human, the harness attached to the leading end of the sprung rigid member.

8. An apparatus comprising:
a pull-behind carriage having two wheels;
a pulling assembly comprising:
   a rigid drawbar attached at a trailing end thereof to said carriage, wherein the drawbar is attached rigidly to the carriage; and
   a sprung member projecting from a leading end of the rigid drawbar, attached to the drawbar at a trailing end of the sprung member, wherein a leading end of the sprung member can move relative to the drawbar in a vertical plane but not in a horizontal plane, wherein the sprung member at least partially isolates vertical cyclical motion of the leading end of the sprung member from the drawbar; and
a harness configured to be worn by a human, the harness attached to the leading end of the sprung member, wherein said attachment between the harness and the leading end of the sprung member is a one and only supportive attachment of the pulling assembly to the harness.

9. The apparatus of claim 8, wherein the sprung member is a sprung rigid member.

10. The apparatus of claim 8, wherein the harness is attached to the leading end of the sprung member without slack between the harness and the leading end of the sprung member.

11. The apparatus of claim 8, wherein the sprung member has a fixed length.

12. An apparatus comprising:
a pull-behind carriage having two wheels;
a pulling assembly comprising:
   a rigid drawbar attached at a trailing end thereof to said carriage, wherein the drawbar is attached rigidly to the carriage; and
   a sprung member projecting from a leading end of the rigid drawbar, attached to the drawbar at a trailing end of the sprung member, wherein a leading end of the sprung member can move relative to the drawbar in a vertical plane but not in a horizontal plane, wherein the sprung member at least partially isolates vertical cyclical motion of the leading end of the sprung member from the drawbar; and
a harness configured to be worn by a human, the harness attached to the leading end of the sprung member, wherein the harness is attached to the leading end of the sprung member by a double axis hinge.

* * * * *